(12) United States Patent  (10) Patent No.: US 7,475,220 B1
Hastings                    (45) Date of Patent:    Jan. 6, 2009

(54) BUFFER OVERFLOW DETECTION

(75) Inventor: Andrew B. Hastings, Eagan, MN (US)

(73) Assignee: Cray Incorporated, Seattle, WA (US)

( * ) Notice: Subject to any disclaimer, the term of this patent is extended or adjusted under 35 U.S.C. 154(b) by 61 days.

(21) Appl. No.: 10/643,765

(22) Filed: Aug. 18, 2003

(51) Int. Cl.
G06F 12/00 (2006.01)
G06F 13/00 (2006.01)

(52) U.S. Cl. .................. 711/207; 711/200; 711/154

(58) Field of Classification Search .......... 711/207, 711/205, 202, 203, 204, 206, 209, 100, 154, 711/165, 168, 200; 713/200, 165, 166
See application file for complete search history.

(56) References Cited

U.S. PATENT DOCUMENTS

2003/0014667 A1* 1/2003 Kolichtchak ............. 713/201

OTHER PUBLICATIONS

PaX—http://pageexec.virtualave.net/.*

* cited by examiner

*Primary Examiner*—Tuan V. Thai
(74) *Attorney, Agent, or Firm*—Schwegman, Lundberg & Woessner, P.A.; Charles A. Lemaire, Esq.

(57) ABSTRACT

A system includes a memory, a plurality of pages held in the memory, an instruction translation look aside buffer (ITLB), a first data translation look aside buffer (DTLB), and a translation look aside (TLB) miss handler. The system also includes an executable/non-executable (x) indicator associated with each page in memory. The TLB miss handler sets the x-indicator for a particular page to indicate "non-executable" when that page is accessed in a mode that allows writing to that page. The ITLB or the ITLB miss handler refuses to allow instructions from a page with an associated x-indicator of "non-executable" to be loaded into the instruction buffer.

35 Claims, 7 Drawing Sheets

BUFFER OVERFLOW DETECTION

FIELD OF THE INVENTION

The present invention relates generally to the field of computer memory systems, and more particularly to a buffer overflow detection mechanism and apparatus.

BACKGROUND OF THE INVENTION

Virtual memory is a technique that allows processes that may not be entirely in the memory to execute by means of automatic storage allocation upon request. The term virtual memory refers to the abstraction of separating logical memory from physical memory. The logical memory is the memory as seen by the process. The physical memory is the actual location of the memory as seen by the processor. Many times the physical memory is not in main memory of the processor but is actually in a secondary source of memory, such as a disk drive or an array of disk drives. As a result of this separation, the operating system maintains two or more levels of physical memory space. The virtual memory abstraction is implemented by using secondary storage to augment the processor's main memory. Data is transferred from secondary to main storage when necessary. The data is replaced and written back to the secondary storage according to a predetermined replacement algorithm.

Data can be of fixed or variable size. A unit of fixed sized storage is many times designated as a page of storage. When the data swapped is a designated, fixed size, the swapping is called paging. Buffer memory is a part of a main memory on a processor. The data, instructions, and variables needed to perform a process are written into the buffer of the main memory so the processor can use the data, values or instructions to perform a request. Pages of variables, instructions or data can be written into buffer memory. Pages of variables, instructions or data can be read from buffer memory and stored in secondary memory.

One of the items buffer memory stores is return addresses for main memory. Hackers can attack a process and a processor by overwriting the buffer memory and specifically overwriting the return address for main. If the return address is overwritten, the process will discontinue. If the return address is overwritten with another address, such as the address for the buffer, the hacker can take over the process with instructions input by the hacker. If the program is a privileged program, the instructions will be allowed to do most anything, including taking over the machine. There is a need for a method and apparatus for preventing such attacks to the main memory of a machine. More specifically, there is a need for a method and apparatus for preventing such attacks to the buffer portion of the main memory to prevent a machine from being taken over.

SUMMARY OF THE INVENTION

To address these and other needs, various embodiments of the present invention are provided. In one embodiment, a system includes a memory, a plurality of pages held in the memory, an instruction translation look aside buffer (ITLB), a first data translation look aside buffer (DTLB), and a translation look aside (TLB) miss handler. The system also includes an executable/non-executable (x) indicator associated with each page in memory. The TLB miss handler sets the x-indicator for a particular page to indicate "non-executable" when that page is accessed in a mode that allows writing to that page. The ITLB refuses to allow instructions from a page with an associated x-indicator of "non-executable" to be loaded into the instruction buffer.

In another embodiment, a system includes a memory, a plurality of pages held in the memory, an instruction translation look aside buffer (ITLB), an ITLB miss handler associated with the ITLB, a data translation look aside buffer (DTLB), and a DTLB miss handler associated with the DTLB. The system also includes an executable/non-executable x-indicator associated with each page in memory. The DTLB miss handler sets the x-indicator for a particular page to indicate "non-executable" when that page is accessed in a mode that allows writing to that page. The ITLB refuses to load instructions from a page if the x-indicator indicates a "non-executable" state. The ITLB miss handler sets the x-indicator to an "executable" state when a page is valid and executable.

A computerized method includes providing a system with a processor having a memory, holding a plurality of pages in the memory, translating an addresses for an instruction fetch, and translating an addresses for a data access. The translating of the address for the instruction fetch is done differently than the translating of the addresses for the data access. In addition, the translating of the address for the data access includes setting a non executable indication. Setting of a non executable indication is done for a page holding the data for a data access.

An apparatus for translating virtual to real addresses in a computing system having a processor and a memory includes a device for holding a plurality of pages in the memory, a device for translating addresses for instructions, and a device for translating addresses for data. The device for translating addresses for instructions operates separately from device for translating addresses for data. In addition, the device for translating the address of a page for a data access further includes a device for setting a non executable indication. These and other embodiments will be described in the detailed description below.

DETAILED DESCRIPTION

In the following detailed description of the embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Figure 1:
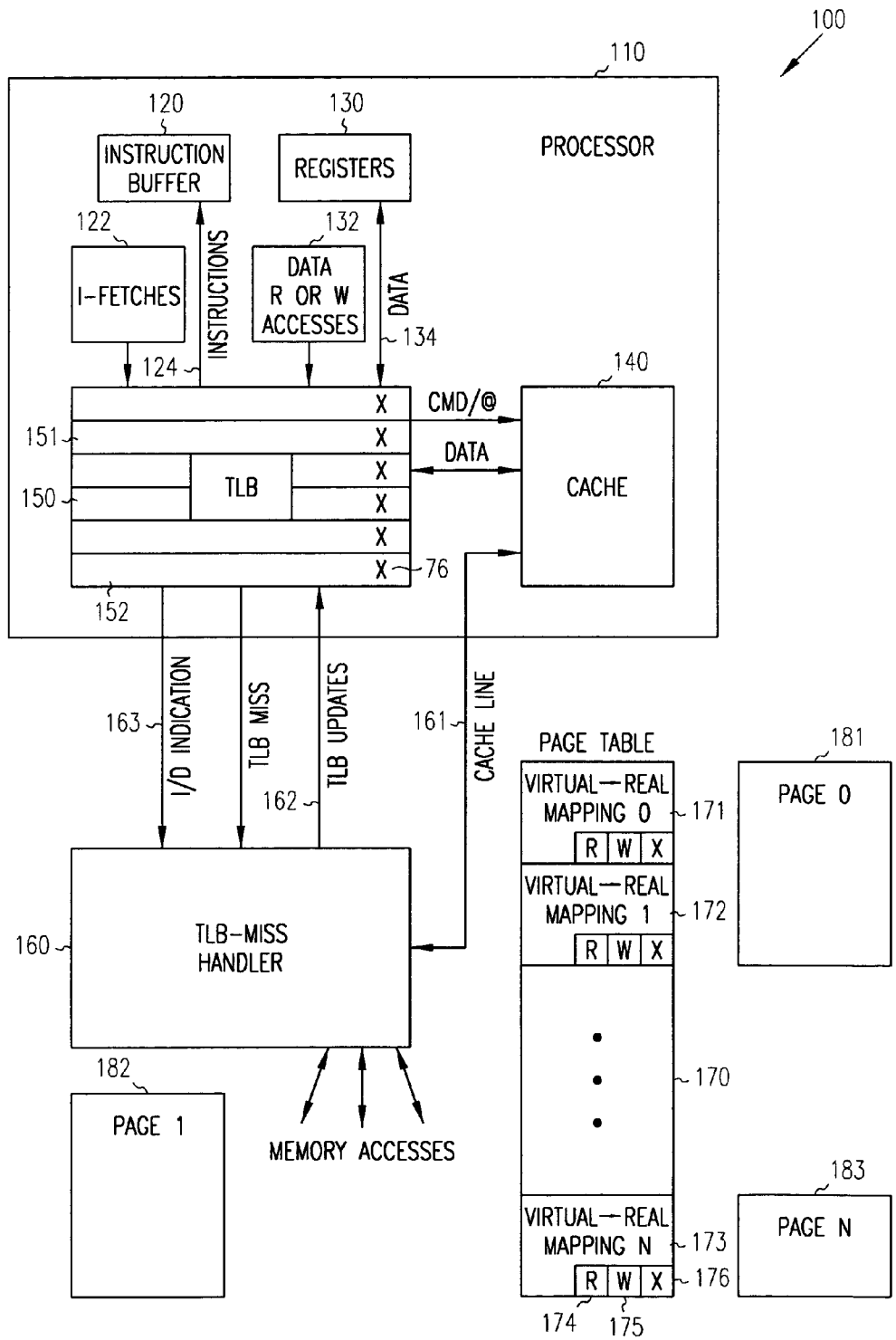
FIG. 1 illustrates a block diagram of a system that includes a subsystem for translating virtual addresses to real addresses for processor, according to an embodiment of the invention.

FIG. 1 illustrates a block diagram of a system 100 that includes a subsystem for translating virtual addresses to real addresses for a processor 110, according to an embodiment of the invention. The processor 110 includes an instruction buffer 120, data registers 130, a cache memory 140 and translation look aside buffer 150. As the processor 110 processes instructions and data, there are some times when the instructions and data are within the processor memory, which includes the instruction buffer 120, the data registers 130 and the cache 140. When a processor 110 wants an instruction or data, the processor 110 sends a request to the translation look aside buffer (TLB) 150. The processor 110 uses a virtual address which differs from the real address for the data or the instruction. When the processor 110 needs instructions, it issues an I-fetch 121 to the TLB 150. Similarly, when the processor 110 seeks data 131, the processor issues a data read or write access command 132 to the TLB 150.

The TLB 150 checks the cache 140 to determine if either the instruction, which is the subject of the I-fetch 122, is within the cache 140, or to determine if the data, which is the subject of the data read or write access command 132, is within the cache 140. If the data or the instruction is within the cache, the TLB 150 checks the data and the instructions for certain conditions. If the conditions are met, an instruction 124 is inserted into the instruction buffer 120 or data 134 is inserted into the registers 130 of the processor 110.

If the TLB 150 does not find the instruction or the register or the instruction, which is the subject of the I-fetch 122, in the cache 140 the TLB 150 produces a TLB miss signal 152 and informs a TLB miss handler 160 that the instruction or data, which is subject of the I-fetch 122 or the data read or write access request 132 was not found in the cache 140. The TLB miss handler then locates the instruction or data in secondary memory or in memory that is not local to the processor 110. The TLB miss handler 160 locates the address of either the instruction sought in the I-fetch 122 or the data sought by the data read or write access request 132 in a page table 170. The page table 170 includes mappings from a virtual address used by the processor to the real address in secondary memory of the actual instruction which is subject of the I-fetch 122, or the data associated with the data read or write access request 132.

As shown in FIG. 1, the page table includes a number of entries 171, 172, 173. Each of the entries 171, 172, 173 maps a virtual address used by the processor 110 to a real address located somewhere in secondary memory or secondary storage. The secondary storage can be any number of devices including disk drives or an array of disk drives. The disk drives could be magnetic, magneto optical or optical disk drives. In addition, the secondary memory could include tape or any other type of storage not associated directly with the processor 110. The secondary storage stores data or instructions in units of memory called pages. As shown in FIG. 1, there is a page 0, which carries the reference numeral 181, a page 1 carrying the reference numeral 182, and a page N which carries the reference numeral 183. The pages 181, 182, 183 correspond to the real location at the real addresses set forth in the page table 170 and, specifically, set forth in the entries 171, 172, 173 in the page table 170.

Each entry in the page table 170 also includes a field or several fields or bits in addition to both the virtual address and the real address. For the sake of discussion, only one page will be discussed as the example. It should be noted, that each entry 171, 172, 173 includes the mapping of the virtual address to the real address for the page, and also includes other indicator information. For example, as shown in page table 170 entry number 173, there is a virtual address and real address mapping. In addition to the mapping of the virtual address to the real address, there are three indicators also included in the page table entry 173. The indicators include a read indicator 174, a write indicator 175, and executable/non-executable indication 176. The indications 174, 175, 176 can take on any number of forms, including a bit which is enabled or disabled or a field within the page table record that indicates whether the indicators are set on or set off.

When a read indication 174 is set on, it indicates that page N is valid and readable. When a write indication 175 is set on, the write indication indicates that the page N 183 can be changed or written to. This is an exclusive operation since at any particular time either data or instructions can only be changed by one processor. Typically, when a page N 183 can be written to, both the read indication 174 and the write indication 175 will be set on or enabled. The read indication 174 indicates that the page is valid and readable, while the write indication 175 gives the particular processor the ability to modify or write to page N 183. When the page N 183 includes instructions, the page table 170, and specifically the entry on the page table 173, will include an indication 176 that the instructions are executable.

When instructions are being fetched, the readable indication 174 will be enabled as well as the executable indication 176. In some instances, each of the indicators 174, 175, 176 will be enabled so that the page N 183 is readable and valid, capable of being changed or written to 175, and can also be executed or have an indication that the x-indicator 176 indicates it is executable. When data is found on page N, the x-indicator or executable/non-executable indication will be set to a non-executable state. In other words, when data resides on page N 183, the mapping entry will include the fact that the x-indicator bit 176 is set so that the information in terms of data cannot be executed. It should be noted that for each of the entries 171, 172, 173 on the page table 170, there is a read indication 174, a write indicator 175, and a executable/non-executable indicator 176. These various indicators 174, 175, 176 change based upon the type of information stored in their respective pages as well as the priority given to the processor 110. Most importantly, when data is stored on one of the pages 181, 182, 183 the x-indicator bit will be set to non-executable. When valid instructions are stored on one of the pages 181, 182, 183 the x-indicator bit will be set to an executable state or an executable condition. After the TLB miss handler 160 uses the page table 170 to locate the pages 181, 182, 183 at their various respective real addresses, the TLB miss handler 160 either fetches an instruction from one of the pages 181, 182, 183 or fetches at least several lines of the instructions and delivers at least a cache line 161 to the cache 140.

The TLB miss handler 161 also delivers an update to the TLB 150 in the form of a TLB update 162. Also corresponding to each update is an instruction/data indication 163. The instructions/data (I/D) is delivered to the TLB 150. The TLB 150 includes a number of entries 151, 152. Each entry in the TLB is a mapping of the virtual address used by the processor 110 to a line or lines in cache 140. Each of the entries 151, 152, in addition to the mapping between the virtual address and the lines in the cache 140 also includes an x-indicator 76. The x-indicator indicates whether the data associated with the entry is executable or non-executable. Thus, when the TLB miss handler obtains data or instructions from one of the pages 181, 182, 183, the TLB miss handler 160 places lines of either data or instructions, called cache lines, into the cache 140, and also updates the cache 162 with a new mapping of the virtual address of the processor versus the location of the cache lines within the cache 140. The entry 152 not only includes the mapping but also the x-indicator 76. The I/D indication 163 is actually the x-indicator read from a record on the page table 170 for the particular data or instruction that the TLB miss handler is now delivering to cache 140. In other words, the I/D indication is the state of the x-indicator 176, which is placed with the appropriate record in the TLB 150, or the appropriate mapping related to a record 152 within the TLB 150. In other words, the I/D indication 163 goes along with the TLB update 162 to form a complete record 152 within the TLB. The I/D indication is the x-indicator 176 of a particular record 173. The x-indicator located in the TLB carries the reference numeral 76. It should be noted that the x-indicator 76 would be equal to the x-indicator 176 for data or an instruction which is obtained by the TLB miss handler and placed into cache 140. In other words, for a particular instruction the x-indicator 76 will be set as executable for a valid instruction while the x-indicator 76 will be set as non-executable for data.

The TLB 170 treats an instruction fetch 122 different from a data read or write access request 132. When an instruction fetch 122 is requested by the processor, the TLB 170 checks the cache 140 to determine if several lines of cache correspond to the instructions needed for the I-fetch 122. The TLB 170 also checks the x-indicator 76. When the x-indicator is set as executable, the TLB then loads the instructions 124 into the instruction buffer 120 in response to the I-fetch 122. If, however, the x-indicator is set to non-executable, the TLB refuses to load the instructions 124 into the instruction buffer. In response to a data read or write access request 132, the TLB 150 checks the entries 151, 152 within the TLB 150 to determine if the data or certain lines of corresponding to the data read or write access request 132 are located in the cache 140. If the data is located there, the data is transferred by the TLB into the registers 130 as depicted by data 134 moving from the TLB 150 to the registers 130.

In one embodiment, the data 134 is delivered to the register 130 without checking the x-indicator 76. In another embodiment, the data 134 is delivered to the registers 130 only after the x-indicator 76 has been checked. The x-indicator 76 for cache lines within the cache 140 should be set to non-executable if the cache lines include data. It should be noted that the x-indicator 76 for a particular set of instructions or for a particular portion of data will most of the time be equal to the x-indicator 176 found in a record in the page table 170. There may be times, however, when the instructions are being modified. As the instructions are being modified, the x-indicator 176 is set to non-executable. Once the instructions are modified, the x-bit can then be set to executable. Thus, there may be instances where the x-indicator 76 does not equal the x-indicator 176 for corresponding instructions.

It should be noted that FIG. 1 has a processor 110 which includes an instruction buffer 120 and registers 130. The instruction buffer receives instructions 124 while the registers 130 receive data 134. One TLB is used to fulfill I-fetches 122, as well as data read or write access requests 132. The entries 151, 152 within the TLB 150 include an instruction/data indication in the form of an x-indicator 76. For data, the x-indicator will be set to non-executable while for instructions the x-indicator will be set to executable. The TLB also reviews the status of the x-indicator, especially when responding to I-fetches 122. If the x-indicator 76 is set to non-executable for information obtained to fulfill an I-fetch 122, the TLB refuses to load the instructions 124 into the instruction buffer. If the x-indicator is set to executable then the TLB will load the instructions 124 into the instruction buffer 120.

It should be noted that the system for translating virtual addresses to real addresses not only includes the processor but also the TLB miss handler 160, the page table 170, the pages 181, 182, 183, as well as the various signals for delivering cache lines 161 to the cache 140, delivering TLB updates 162 and for delivering an I/D indication 163 to the TLB 150.

Figure 2:
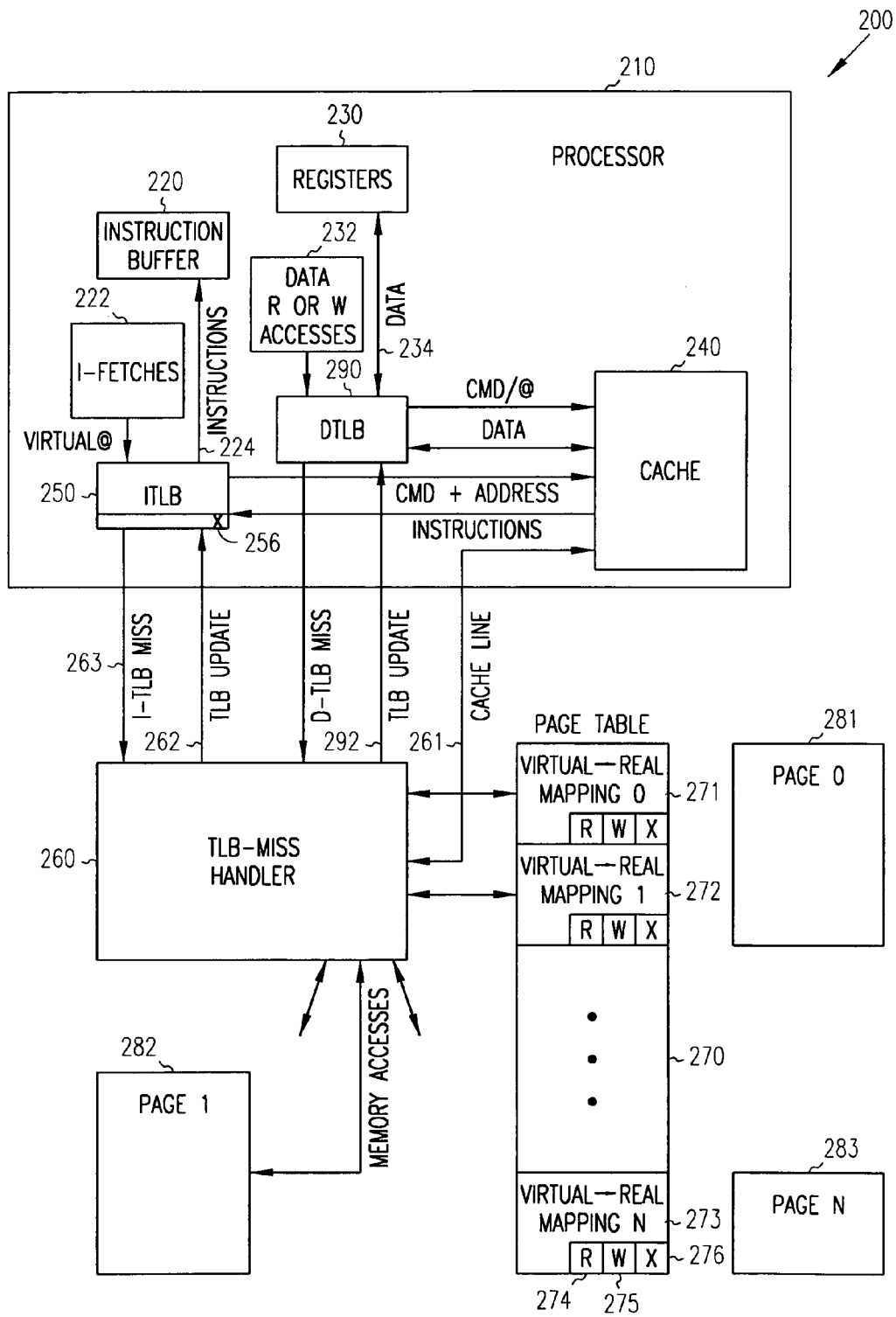
FIG. 2 illustrates a block diagram of another system that includes a subsystem for translating virtual addresses to real addresses for processor, according to another embodiment of the invention.

FIG. 2 illustrates a block diagram of another system 200 that includes a subsystem for translating virtual addresses to real addresses for a processor 210, according to an embodiment of this invention. The system 200 includes the processor 210, a TLB miss handler 260, a page table 270, as well as various pages 281, 282, 283. The processor 210 includes an instruction buffer 220 and a register 230. The processor also includes an instruction translation look aside buffer (ITLB) 250 and a data translation look aside buffer 290. The processor 210 requests instructions using I-fetches 222 directed to the ITLB 250. The ITLB then checks the cache to determine if the instructions are within the cache 240. When not in the cache, the ITLB 250 sends an ITLB miss signal to the TLB miss handler 260. The TLB miss handler then consults the page table 270 to find the mapping of the virtual address used by the processor to the real address to one of the pages in secondary memory. The pages, as shown in FIG. 2, include page 0 which carries a reference 281, page 1 which carries a reference numeral 282, and page N which carries a reference numeral 283. As mentioned previously, pages are units of memory that are found in various secondary sources of memory such as disk drives or arrays or other types of memory.

The page table 270 includes entries 271, 272, 273, which correspond to the pages 281, 282, 283, respectively. Each entry includes a virtual address and a real address for the particular page as well as a read indicator 274, a write indicator 275, and a non-executable/executable x-indicator 276. Each of the entries 271, 272, 273 in the page table 270 include the read indicator 274, write indicator 275, and the x-indicator 276. However, only the indicators within entry 273 are provided with reference numerals for the sake of clarity. When the TLB miss handler 260 finds the instruction at one of the pages 281, 282, 283 or other pages, the TLB miss handler 260 also checks or reads the various indicators, namely the read indicator 274, the write indicator 275, and the x-indicator 276. When an instruction fetch is not found in the cache 240 by the ITLB 250, the TLB miss handler 260 finds the instruction and then delivers a series of cache lines 261 to the cache 260.

As the cache lines 261, which include instructions, are being loaded into the cache 240, the TLB miss handler 260 also sends a TLB update 262 to the ITLB 250. The TLB update includes the virtual address used by the processor and the cache lines within the cache 240 so that an entry or a mapping is stored within the ITLB. The TLB update to the ITLB 250 also includes an update with respect to the x-indicator 256. If the ITLB is asked to deliver instructions for a particular set of instructions where the x-indicator 256 is set to the non-executable mode, the ITLB 250 will refuse or will not load the instructions into the instruction buffer 220. If the x-indicator 256 within the entry in the ITLB 250 is set to an executable state, the instructions are located into the instruction buffer 222 thereby fulfilling the I-fetch 222 request of the processor 210. Thus, the ITLB 250 includes a set of entries which map the virtual address of the processor to lines in cache 240 where the instructions will be found. Each entry also includes an x-indicator 256. The ITLB will refuse to load instructions for an instruction set that has the x-indicator set to non-executable. The ITLB thus checks the x-indicator to determine whether or not to load the instructions 224 into the instruction buffer 220. Thus, it should also be pointed out the ITLB handles all instructions. The ITLB is dedicated to fulfilling the instruction requests or I-fetches 222 of the processor 210.

In another embodiment, the entry or entries within ITLB 250 would not include a x-indicator 256. In this particular embodiment, the TLB miss handler would check the x-indicator 276 to assure that it is executable when responding to an I-fetch request that produces an ITLB miss 263. If the x-indicator 276 indicates that the instructions are not executable, the TLB miss handler 260 would refuse to update the cache or write the instructions to cache and would produce an execution error to the system. If the TLB miss handler 260 refuses to load the cache 240 with instructions or with cache lines that include instructions 261 and also refuses to update the ITLB, then ITLB would not have to carry or include an x-indicator because the TLB miss handler would be checking for executable x-indicators and would not update the ITLB 250 unless the instructions were in fact executable. Therefore, if the ITLB included an entry to the instructions in the cache, the processor would know that the instructions were executable since the TLB miss handler 260 had previously checked the state of the x-indicator to determine if it is executable before loading it into cache and before updating the ITLB.

Also included within the processor 210 is the data read or write access translation look aside buffer (DTLB) 290. The DTLB handles all the read or write access requests 232 of the processor 210. The DTLB checks the cache 240 to determine if data is within the cache 240 that fulfills the data read or write access request 232. In the event that the DTLB 290 does not find the data within the cache, a DTLB miss signal is sent to the TLB miss handler 260. The TLB miss handler 260 uses the page table 270 to find the data of the data read or write access request. The page table 270 includes both the virtual address used by the processor as well as the real address which points to the location of the data on various pages 281, 282, 283. Once the TLB miss handler 260 finds the location of the data, several cache lines 261 of data are delivered to the cache 240. The TLB miss handler 260 also updates the DTLB as indicated by reference numeral 292.

The TLB updates include the virtual address and the location within the cache of the data. The TLB updates can also include a read indicator 274 and a write indicator 275. In some embodiments, the TLB miss handler will refuse to load data that does not have the read indicator enabled. When the read indicator is not enabled, the pages is unreadable and therefore the page is invalid. The TLB miss handler 260, in some embodiments, will refuse to load invalid data pages to the cache and will also refuse to update the DTLB 290 with information regarding invalid pages. The TLB miss handler 260 would then produce a read fault for further processing. In other embodiments, the DTLB would check the write indicator 275 to make sure that it matched the write state of the data found in secondary memory or on one of the pages 281, 282, 283 to make sure that it corresponded to the read or write access request 232 sent by the processor 210. In the event that the request was a request for write, the write indicator 275 must enable that writing to the data is allowable. The DTLB 290 would check the write access and if it did not correspond to the write access request, or data read or write access request 232, then the DTLB would refuse to load the data into the registers 230. The DTLB would then produce a write error either directly to the processor or via the TLB miss handler 260.

Figure 3:
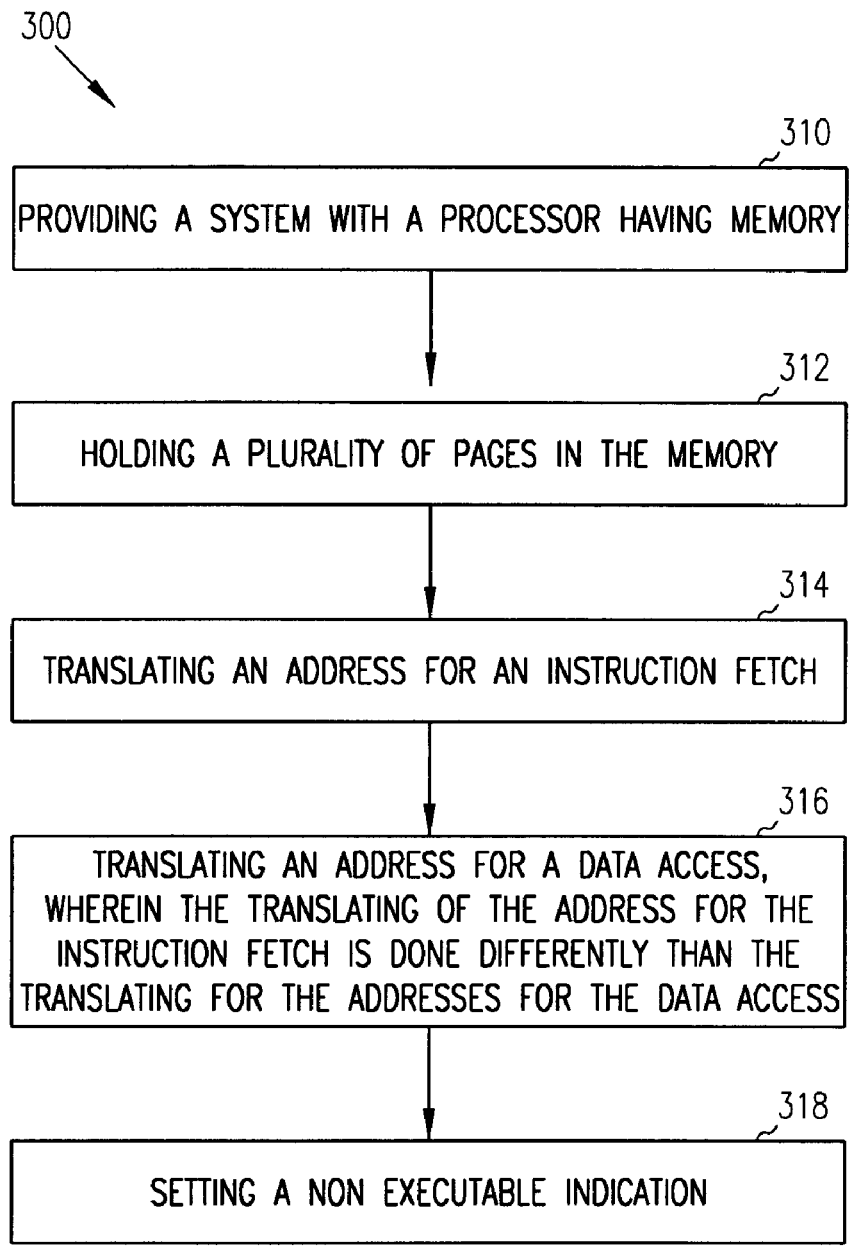
FIG. 3 illustrates a flow diagram including the method of operation of the invention, according to one embodiment of the invention.

FIG. 3 illustrates a flow diagram including the method of operation 300, according to an embodiment of the invention. The computerized method 300 includes providing a system with a processor having a memory 310, holding a plurality of pages in the memory 312, translating an addresses for an instruction fetch 314, and translating an addresses for a data access 316. The translating of the address for the instruction fetch is done differently than the translating of the addresses for the data access. In addition, the translating of the address for the data access includes setting a non executable indication 318. Setting of a non executable indication 318 is done for a page holding the data for a data access. In some embodiments, the translating of the address for the instruction fetch includes checking the non executable indication. In some embodiments, the translating of the address for the instruction fetch includes checking the non executable indication and disallowing an instruction fetch upon finding the non executable setting. Translating of the address for the data access also includes setting the non executable indication for a page holding the data access address on, if a write indication is set for that page. In some embodiments, the non executable indication is set for a page holding the data access address in response to finding a write indication to allow writing to the page.

It should be noted from the discussion of FIGS. 1 and 2, that in some embodiments the TLB can check the x-indicator such as the x-indicator 76 found in FIG. 1. In this instance, the TLB carries an x-indicator 76 and checks the x-indicator before loading the instructions 124 in to the instruction buffer 120, as shown in FIG. 1. In another embodiment described in FIG. 2 and above, the TLB miss handler 260 checks the X bit or the x-indicator 276 for each record. If the x-indicator 276 is in a non-executable state and the ITLB 250 is requesting the information, the TLB miss handler 260 knows that the request is an I-fetch 222. Therefore, if the x-indicator 276 indicates that the information is non-executable, the TLB miss handler 260 refuses to load the cache with cache lines from the page and also refuses to update the ITLB 250. The TLB miss handler 260 would then generate an execution fault for the particular set of instructions. Thus, it should be noted that either a TLB within the processor or specifically the ITLB 250 within the processor can check the x-indicator 256, or the ITLB miss handler 260 can check the x-indicator 276 and refuse to do operations that would result in instructions 224 being loaded into the instruction buffer 220.

Figure 4:
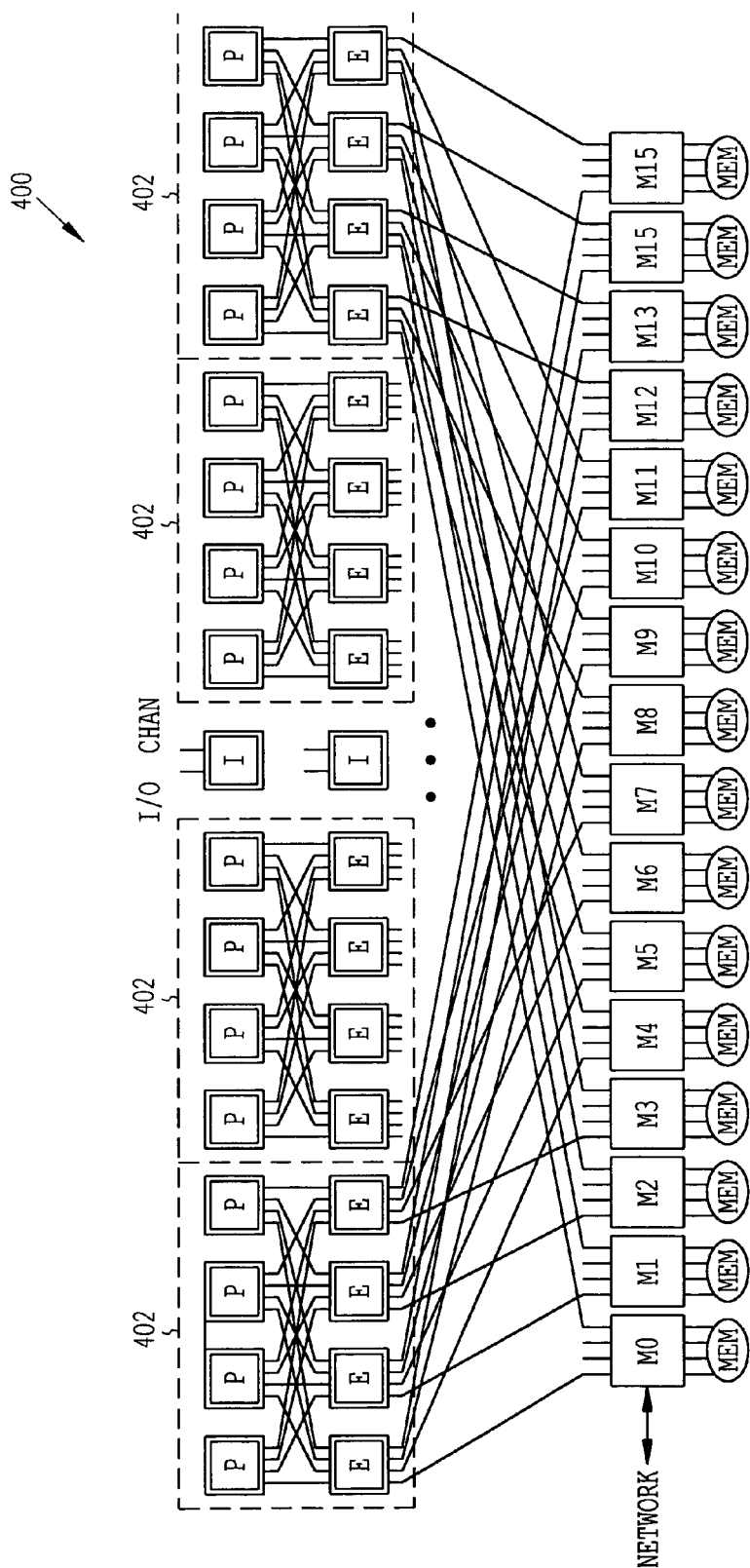
FIG. 4 illustrates a block diagram of a node that includes four multi-streaming processors (MSPs), according to one embodiment of the present invention.

FIG. 4 illustrates a specific hardware environment in which various embodiments of the present invention may be practiced. In one embodiment, the hardware environment is included within the Cray SV2 System Architecture, which represents the convergence of the Cray T3E and the traditional Cray parallel vector processors. The SV2 is a highly scalable, cache coherent, shared-memory multiprocessor that uses powerful vector processors as its building blocks, and implements a modernized vector instruction set. It is to be noted that FIG. 4 illustrates only one example of a hardware environment, and other environments (for other embodiments) may also be used.

FIG. 4 illustrates a block diagram of a node that includes four multi-streaming processors (MSP(s), according to one embodiment. In this embodiment, node 100 includes each MSP 402 in a four MSP system. Node 400 is contained on a single printed circuit board. The sixteen M chips on node 400 contain memory controllers, network interfaces and cache coherence directories with their associated protocol engines. The memory system is sliced across the 16 M chips, round robin by 32-byte cache lines. Each M chip supports one slice. Bits 5 and 6 of the physical address determine the E chip within a processor, and bits 7 and 8 further specify one of four M chips connected to each E chip.

Each M chip resides in one of sixteen independent address slices of the machine, and the interconnection network provides connectivity only between corresponding M chips on different nodes. All activity (cache, memory, network) relating to a line of memory stays within the corresponding slice. Each M chip controls a separate sector of a slice. Slices expand (get more memory in each) as nodes are added so the number of sectors in each slice is equal to the number of nodes in a system.

Total peak local memory bandwidth for one node is 204.8 GB/s, or 51.2 GB/s per MSP. As each MSP 402 needs a maximum bandwidth of about 45 GB/s, there is bandwidth to support network traffic and I/O without greatly impacting computational performance. Each M chip contains two network ports, each 1.6 GB/s peak per direction.

Node 400 also contains two I chip I/O controller ASIC(s. These connect to the M chips and provide four I/O ports of 1.2 GB/s bandwidth, full duplex, off node 100. Each I chip contains two ports, 400 MB/s full duplex connections to 8 of the local M chips (one I chip connects to the even M chips and the other connects to the odd M chips), and a 1.6 GB/s full duplex connection to the other I chip. The total I/O bandwidth per module is thus 4.8 GB/s full duplex.

The memory on node 400 is distributed across the set of 16 M chips. Each M chip directly controls the resources contained on two daughter boards so that there are thirty two daughter boards on node 400. The memory chips in the daughter boards are Direct Rambus DRAM. These chips have 16 internal banks and have 18 data pins that each run, with a 400 MHz clock, at an 800 Mbaud rate. Each chip then has a 1.6 GB/s read/write data rate. Being 18 bits wide, additional parts to support ECC are not needed. Daughter cards contain 16 chips organized into 4 memory channels of 4 chips each. Each memory channel is independent. Channels have a peak data bandwidth of 1.6 GB/s, so that the card supports a bandwidth of 6.4 GB/s. With 16 banks in a memory chip, a channel has 64 memory banks. Daughter cards with 64 Mbit, 128 Mbit, 256 Mbit or 512 Mbit chips are supported. The design also accommodates chip densities of 1 Gbit if and when they become available, assuming they fit in the design envelope (size, power, etc.). As the memory parts are 18 bits wide instead of 16 in order to support ECC, the chip(s bit densities are actually 72, 144, 288, 576 and 1152 Mbits.

The various embodiments of the present invention provide a virtual-to-physical address translation mechanism for a shared-memory multiprocessor that scales efficiently to large numbers of processors. This mechanism supports a single virtual address format (e.g., using load or store instructions), and detects whether a reference for the instruction is to the local node or a remote node. If to a local node, the virtual-to-physical address translation is performed in the local translation look-aside buffer (TLB), producing a physical address that includes both the physical node number and the physical memory offset within that node. The address translation mechanism of these embodiments scales to large system sizes, because each node keeps track of virtual-to-physical page mappings for its node only. The TLB is used for references to the local node by the local processor.

Figure 5:
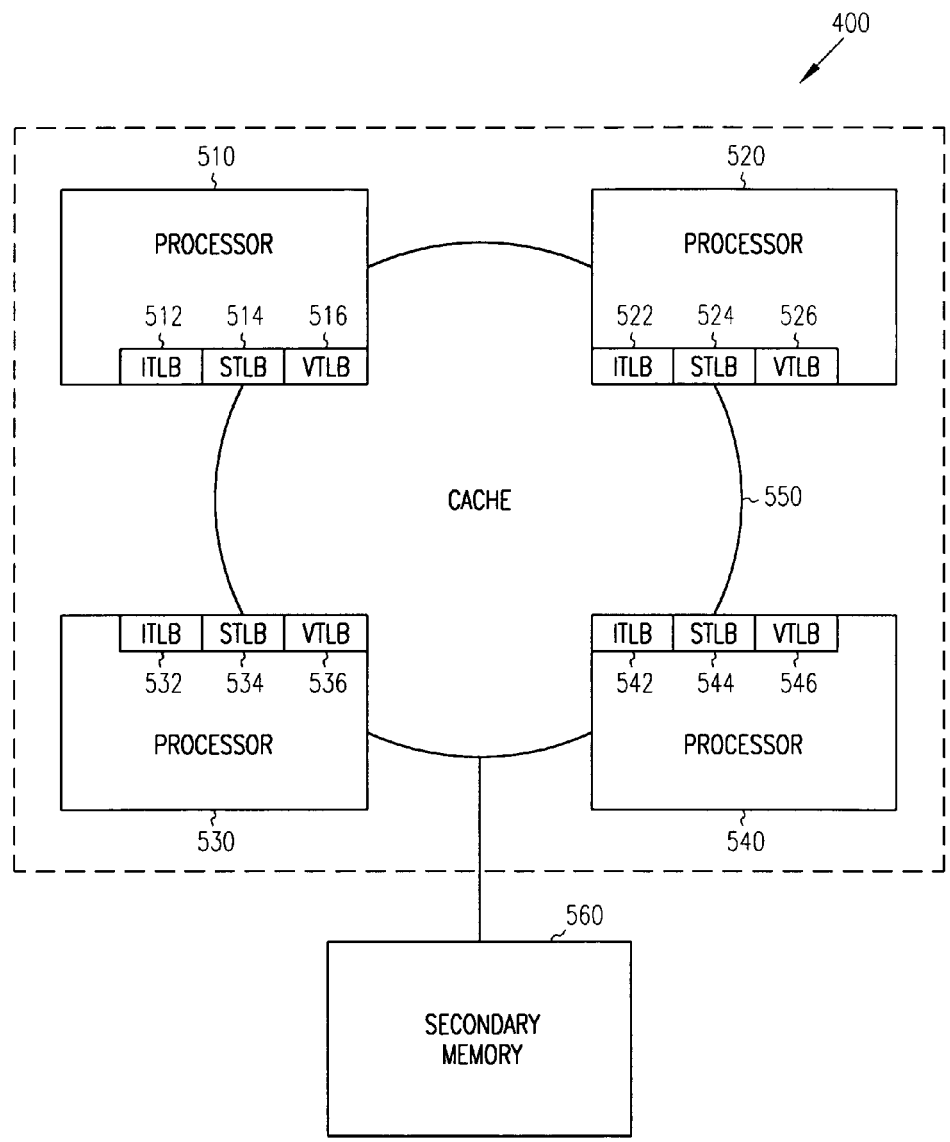
FIG. 5 illustrates a block diagram of a node 400 that includes four processors sharing a cache memory, according to one embodiment of the present invention.

FIG. 5 illustrates a block diagram of a node 400 that includes four processors 510, 520, 530, 540 that share a cache 550. The cache 550 and the node 400 are attached to secondary memory 560. Each of the processors includes a separate TLB for various types of either instructions or data. For example, processor 510 includes an ITLB 512 for handling instruction fetches requested by the processor 510. A scalar transfer look aside buffer (STLB) 514 for handling data related to scalar values and a vector translation look aside buffer (VTLB) 516 for handling access read and write requests related to vectors. The ITLB 512 handles all instruction fetch requests while the STLB 514 and the VTLB handle scalar memory access requests and vector memory access requests, respectively. Similarly, the processor 520 includes an ITLB 522, and STLB 524 and a VTLB 526. Processor 530 also includes an ITLB 532, an STLB 534 and a VTLB 536. Processor 540 includes an ITLB 542, and STLB 544 and a VTLB 546. Each of the respective TLBs, instruction, scalar and vector, handle instruction fetches, scalar memory access requests and vector memory access requests respectively in the same way. The various TLBs initially check the shared cache 550 to determine if the data or instruction requested is within the cache 550. If the data or instruction is not within the cache, a TLB miss is produced by the ITLB, STLB, or VTLB and a TLB miss handler obtains the data, delivers it to the cache as detailed more fully with respect to the discussion in the following FIGS. 6 and 7. The TLB miss handler (not shown in FIG. 5) will receive the various instructions or data from the secondary memory 560.

Figure 6:
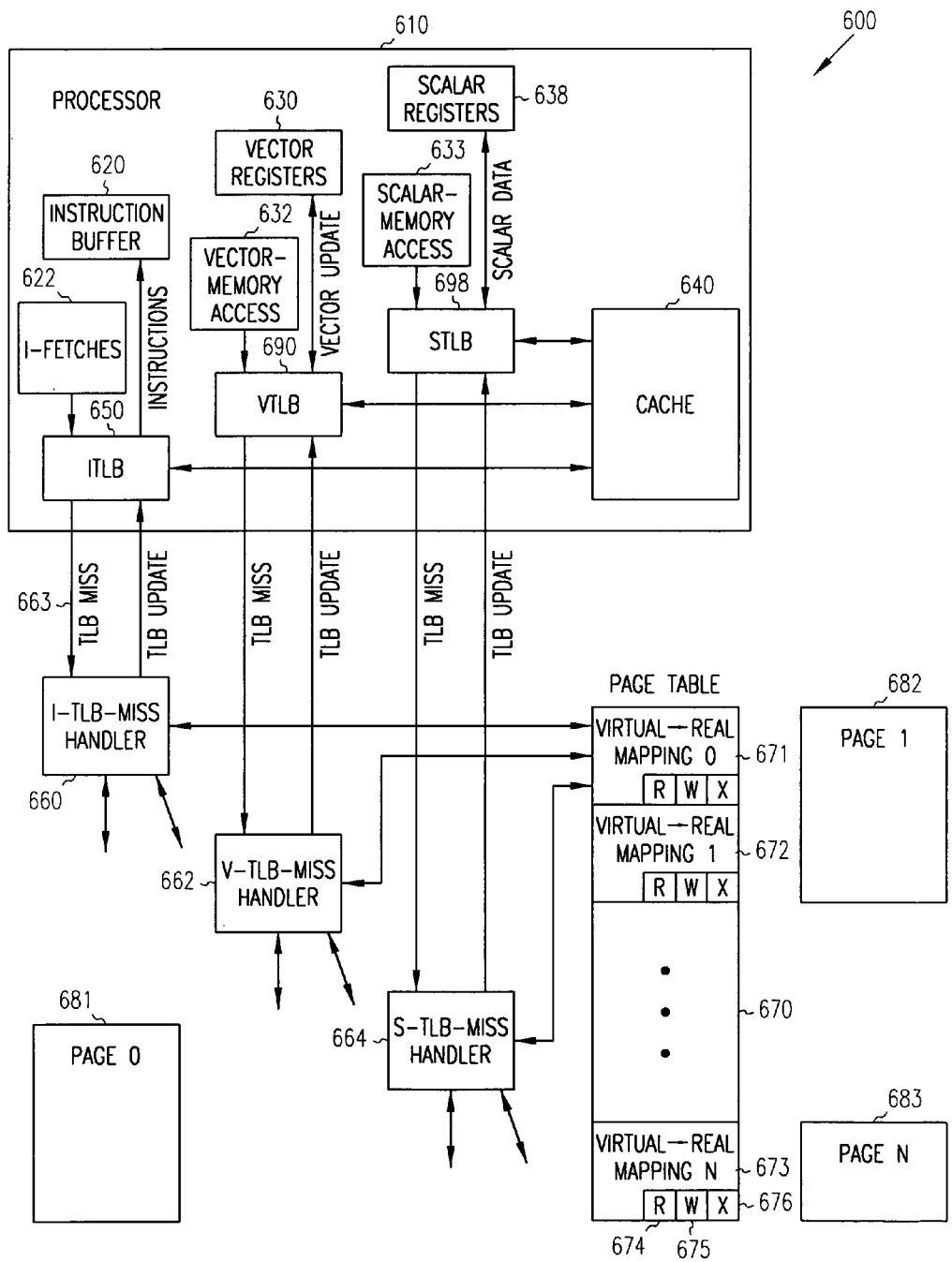
FIG. 6 illustrates a block diagram of another system that includes a subsystem for translating virtual addresses to real addresses for processor, according to another embodiment of the invention.

FIG. 6 illustrates a block diagram of another system 600 including a subsystem for translating virtual addresses to real address for a processor 610, according to another embodiment of the invention. FIG. 6 shows a single processor. In some embodiments of this invention, the single processor corresponds to one of the processors associated with a node that has multiple processors. The processor 610 includes an instruction buffer 620, a vector register 630, and a scalar register 638. The processor 610 also includes an ITLB 650, a VTLB 690 and an STLB 698. Therefore, there is a translation look aside buffer associated with each of the instruction buffer 620, the vector register 630, and the scalar register 638. The processor 610 also includes cache 640.

The ITLB 650 responds to I-fetches 622 from the processor 620. The ITLB 650 checks the cache 640 to determine if the instructions which fulfill the I-fetch 622 are located within the cache 640. If the instructions are not within the cache 640, the ITLB produces an ITLB miss signal 663 and sends it to the an ITLB miss handler 660. Similarly, the VTLB 690 initially checks the cache 640 to determine if the vector data necessary to fulfill a vector memory access 632 is located within the cache 640. If it is not within the cache, the VTLB 690 produces a VTLB miss which is sent to a VTLB miss handler 662. Similarly, the STLB responds to a scalar memory request 633 by initially checking the cache 640 to determine if the scalar data necessary to fill the scalar memory access request 633 is within the cache 640. If the scalar data is not within the cache 640, the STLB 698 produces a missed STLB to the signal and sends it to an STLB miss handler 664.

Thus, it should be noted that the ITLB 650 has a dedicated ITLB miss handler 660, the VTLB 690 has an associated VTLB miss handler 662, and the STLB 698 has an associated STLB miss handler 664. The ITLB miss handler 660 handles misses produced by the ITLB 650 while the VTLB miss handler 662 acts on and produces the data for misses produced by the VTLB 690 and the STLB miss handler 664 responds to misses produced by the STLB 698. In response to a miss 663 on the ITLB 650, the ITLB miss handler 660 consults a page table 670 that has entries 671, 672, and 673. Each of the entries in the page table 670 includes a read indicator 674, a write indicator 675, and an x-indicator 676. The x-indicator 676 indicates whether the information found on a particular page is executable and therefore a valid instruction or non-executable and therefore not a valid instruction, or merely data.

In one embodiment of the invention, the ITLB miss handler 660 checks the x-indicator 676 and if the x-indicator indicates that it is non-executable, the ITLB miss handler 660 refuses to update the ITLB or deliver cache lines to the cache 640. Therefore, the ITLB miss handler 660 checks the x-indicator to determine whether or not the instructions found are valid and executable. When they are not, the ITLB miss handler 660 refuses to load the instructions in the cache and refuses to update the ITLB 650. In this instance, the ITLB miss handler 660 produces and execute fault for further processing by the computing system.

In another embodiment, the ITLB miss handler 660 reads the instruction found at a page and loads cache lines into the cache 640. The ITLB miss handler 660 also updates the ITLB 650. As part of the update, the ITLB miss handler 660 would load the ITLB 650 with the virtual address of the processor, the location of the lines of cache where the instructions had been inserted and the state of the x-indicator 676. All of these would be associated within each entry of the ITLB 650. In the event that the ITLB has an entry with a x-indicator that is set to a non-executable state, the ITLB 650 would then refuse to load the instructions from the cache 640 in to the instruction buffer 620. Therefore, in summary, in one embodiment the ITLB miss handler 660 would refuse to update the ITLB 650 entries and would also refuse to load the cache 640 with instructions that have been indicated as non-executable. In another embodiment of the invention, the ITLB miss handler 660 would load the instructions as well as load an update into the ITLB 650 which would indicate that the instructions were non-executable. In this event, then the ITLB 650 would refuse or disallow loading of the instructions into the instruction buffer 620. In either event, either the ITLB 650 or the ITLB miss handler 660 take actions to disallow instructions from being loaded into the instruction buffer when there is an indication that the x-indicator states that the instructions are not executable.

The VTLB 690 and the STLB 698 would operate in a similar fashion. Both operate differently when compared to the ITLB 650. The major difference is that the VTLB 690 handles vector data while the STLB 698 handles scalar data. It should be noted that the STLB's 698 operation is substantially similar to that of the VTLB 690. Therefore, only the VTLB 690 will be described. In the event that the VTLB 690 fails to find the data necessary to fulfill the vector memory access 632 in the cache 640, the VTLB 690 produces a miss VTLB signal and alerts the VTLB miss handler 662 of the miss. The VTLB miss handler 662 refers to the page table 670 and its mapping of the virtual address used by the processor 610 to the actual or real address where the vector data can be found in secondary memory on either pages 681, 682, 683. The VTLB miss handler 662 then checks the read indicator to make sure that the data was readable. If the data is readable, the VTLB miss handler 662 would load the cache with several lines of the vector data and update the VTLB 690 with the location within cache 640, as well as the virtual address used by the processor. The VTLB miss handler 662 would also update the VTLB entry formed with the write indication 675.

The VTLB would then check the write indication when fulfilling the vector memory access request 632. If the VTLB 690 entry for the write indicator 675 matches the write indication necessary to fulfill the vector memory access 632, then the vector data would be loaded from the cache 640 into the vector register 632 by the VTLB. In the event that the write indicator did not match, the vector memory access request then the VTLB 690 would produce a write error which would be sent for further processing and correction. Again, the scalar memory access request 633 would be fulfilled by the STLB 698 and the STLB miss handler 664 in the same fashion as the VTLB 690 and the VTLB miss handler 662 fulfill the vector memory access requests.

Figure 7:
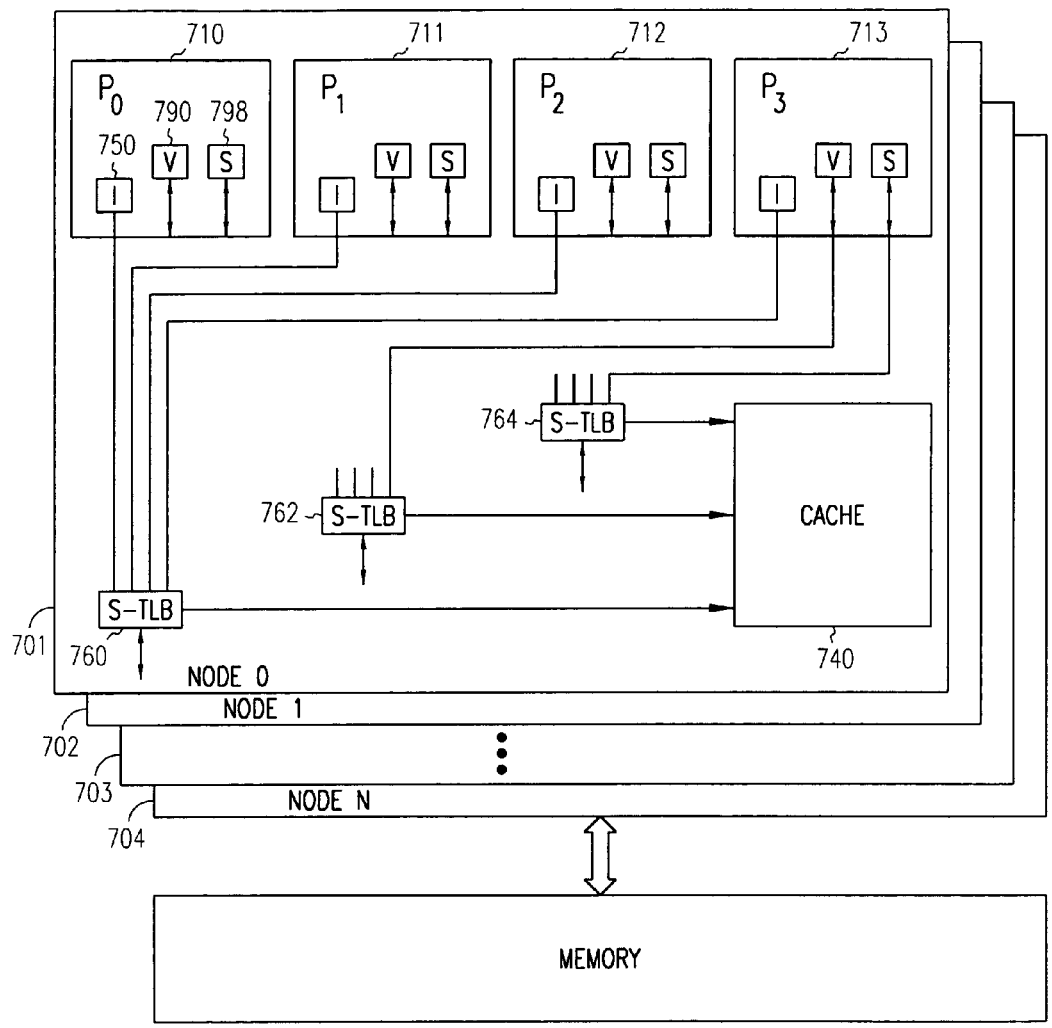
FIG. 7 illustrates several substantially identical nodes that include multiple processors that include a subsystem for translating virtual addresses to real addresses for processor, according to another embodiment of the invention.

FIG. 7 shows yet another embodiment of the invention. FIG. 7 shows several substantially identical nodes 701, 702, 703 and 704. Each node, such as node 701 includes multiple processors. For example, node 701 includes four processors 710, 711, 712 and 713. Each processor 710, 711, 712, 713 has a separate ITLB, VTLB, and STLB for each of the processors 710, 711, 712, 713. For example, processor 710 includes an ITLB 750, a VTLB 790, and an STLB 798. In addition, each node 701, 702, 703, 704 also includes an ITLB miss handler 760 that handles missed ITLB signals from the ITLBs 650 from each of the processors 710, 711, 712, 713. The node also includes a VTLB miss handlers 762, which handles missed VTLB hits from the various VTLBs, such as VTLB 790, aboard the first processor 710, the second processor 711, the third processor 712 and the fourth processor 713. The node 701 also includes an STLB miss handler 764 that handles missed STLB signals from each of the processors 710, 711, 712, 713. Each of the nodes 701, 702, 703, 704 has a similar arrangement. The major difference between the system 600 shown in FIG. 6 and a system 700 shown in FIG. 7 is that the ITLB miss handler 760, the VTLB miss handler 762 and the STLB miss handler 764 handle cache miss hits from more than one ITLB, VTLB and STLB. For example, as shown in FIG. 7 the ITLB miss handler 760 handles ITLB miss signals from ITLBs on each of the processors 710, 711, 712, 713. The other major difference is that the ITLB on each node works on a memory accessible by each of the nodes 701, 702, 703, 704. The operation of the ITLB miss handler 760 and the individual ITLBs associated with the individual processors 710, 711, 712, 713 operate in much the same way as discussed above with respect to FIG. 6. The operation of the VTLB miss handler 762 and the individual VTLBs associated with the individual processors 710, 711, 712, 713 operate in much the same way as discussed above with respect to FIG. 6. Furthermore, the operation of the STLB miss handler 764 and the individual STLBs associated with the individual processors 710, 711, 712, 713 operate in much the same way as discussed above with respect to FIG. 6. Each of the nodes interfaces with a common memory. The ITLB miss handler 760, the VTLB miss handler 762 and the STLB miss handler 764 must deliver cache lines to a cache 740. The ITLB miss handler 760, the VTLB miss handler 762 and the STLB miss handler 764 must be able to update the ITLBs, the VTLBs and the STLBs aboard the various processors 710, 711, 712, 713.

Figure 8:
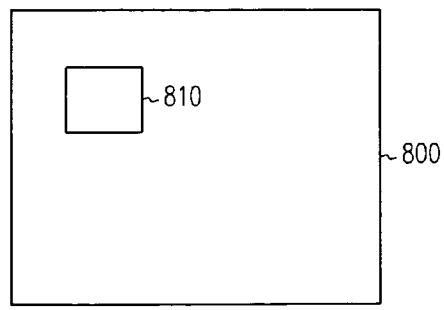
FIG. 8 illustrates a block diagram of a computer readable medium that includes an instruction set thereon, according to an embodiment of this invention.

FIG. 8 illustrates a block diagram of a computer readable medium 800 that includes an instruction set 810 thereon, according to an embodiment of this invention. As mentioned above, the subsystems for handling memory requests for instructions and data may be implemented in whole or in part as software. The instructions 810 for controlling the memory subsystems as discussed above, can be included on a computer readable medium 800. The computer readable medium 800 can include any type of computer readable medium, including but not limited to the internet, another type of network, a floppy disk, a CD-ROM, a hard disk, or the like.

In one embodiment, a system includes a memory, a plurality of pages held in the memory, an instruction translation look aside buffer (ITLB), a first data translation look aside buffer (DTLB), and a translation look aside (TLB) miss handler. The system also includes an executable/non-executable (x) indicator associated with each page in memory. The TLB miss handler sets the x-indicator for a particular page to indicate "non-executable" when that page is accessed in a mode that allows writing to that page. The ITLB refuses to allow instructions from a page with an associated x-indicator of "non-executable" to be loaded into the instruction buffer. In some embodiments, the TLB miss handler is implemented at least in part as software. In some embodiments, the DTLB is utilized only for vector accesses to memory while in other embodiments, the DTLB is utilized only for scalar accesses to memory. The system further includes, for each page in memory, a read bit indicating that the page is valid and readable, and a write bit indicating that the page is valid and writable. In some embodiments the system further includes, for each page in memory, a write bit associated with each page in memory that indicates the respective page is writable. The system also a page table used to translate a virtual address to a real address. The page table has the x-indicator associated with each page is held in the page table entry. The page table also includes a write bit in each page table entry. In some embodiments, the page table includes a write bit in each page table entry, and a read bit in each page table entry.

In another embodiment, a system includes a memory, a plurality of pages held in the memory, an instruction translation look aside buffer (ITLB), an ITLB miss handler associated with the ITLB, a data translation look aside buffer (DTLB), and a DTLB miss handler associated with the DTLB. The system also includes an executable/non-executable x-indicator associated with each page in memory. The DTLB miss handler sets the x-indicator for a particular page to indicate "non-executable" when that page is accessed in a mode that allows writing to that page. The ITLB refuses to load instructions from a page if the x-indicator indicates a "non-executable" state. The ITLB miss handler sets the x-indicator to an "executable" state when a page is valid and executable. In some embodiments, the ITLB miss handler is implemented, at least in part, as software. In some other embodiments, the DTLB miss handler is also implemented, at least in part, as software. In some embodiments, the DTLB is utilized only for scalar accesses to memory while in other embodiments, the DTLB is utilized only for vector accesses to memory. The system further includes, for each page in memory, a read bit indicating that the page is valid and readable, and a write bit indicating that the page is valid and writable. The system also includes a page table used to translate a virtual address to a real address. The entries in the page table include the x-indicator for each page is held in the page table. In some embodiments, the page table also includes a write bit in each page table entry. In other embodiments, the page table includes a write bit in each page table entry, and a read bit in each page table entry. The write bit associated with each page in memory indicates the respective page is writable.

A computerized method includes providing a system with a processor having a memory, holding a plurality of pages in the memory, translating an addresses for an instruction fetch, and translating an addresses for a data access. The translating of the address for the instruction fetch is done differently than the translating of the addresses for the data access. In addition, the translating of the address for the data access includes setting a non executable indication. Setting of a non executable indication is done for a page holding the data for a data access. In some embodiments, the translating of the address for the instruction fetch includes checking the non executable indication. In some embodiments, the translating of the address for the instruction fetch includes checking the non executable indication and disallowing an instruction fetch upon finding the non executable setting. Translating of the address for the data access also includes setting the non executable indication for a page holding the data access address on if a write indication is set for that page. In some embodiments, the non executable indication is set for a page holding the data access address in response to finding a write indication to allow writing to the page.

An apparatus for translating virtual to real addresses in a computing system having a processor and a memory includes a device for holding a plurality of pages in the memory, a device for translating addresses for instructions, and a device for translating addresses for data. The device for translating addresses for instructions operates separately from device for translating addresses for data. In addition, the device for translating the address of a page for a data access further includes a device for setting a non executable indication. In some embodiments, the device for setting the non executable indication is done for a page holding the data for a data access. The device for translating addresses of an instruction fetch includes a device for checking the non executable indication. The device for translating of the address for the instruction fetch also includes a device for checking the non executable indication, and a device for disallowing an instruction fetch in response to finding the non executable setting. The device for translating of the address for the data access also includes a device for setting the non executable indication for a page holding the data access address on if a write indication is set for that page.

Although specific embodiments have been illustrated and described herein, it will be appreciated by those of ordinary skill in the art that any arrangement that is calculated to achieve the same purpose may be substituted for the specific embodiment shown. For example, other variations of the described embodiments may not include multistream processors (MSP(s), or a sliced memory system. Such variations may include any number of processors (including one) at a node. This application is intended to cover these and other adaptations or variations of the described embodiments of the present invention.

What is claimed is:

1. A system comprising:
    a memory;
    a plurality of pages held in the memory;
    an instruction translation look aside buffer (ITLB);
    a first data translation look aside buffer (DTLB);
    a translation look aside (TLB) miss handler; and
    an executable/non-executable (x) indicator associated with each page in memory wherein the TLB miss handler sets the x-indicator for a particular page to indicate "non-executable" when that page is accessed in a mode that allows writing to that page, and wherein the ITLB refuses to allow instructions from a page with an associated x-indicator of "non-executable" to be loaded.

2. The system of claim 1, wherein the TLB miss handler is implemented at least in part as software.

3. The system of claim 1, further comprising a write bit associated with each page in memory that indicates the respective page is writable.

4. The system of claim 1, further comprising a page table used to translate a virtual address to a real address, wherein the x-indicator for each page is held in the page table entry associated with that page.

5. The system of claim 4, wherein the page table used to translate a virtual address to a real address includes a write bit in each page table entry.

6. A system comprising:
a memory;
a plurality of pages held in the memory;
an instruction translation look aside buffer (ITLB);
a first data translation look aside buffer (DTLB);
a translation look aside (TLB) miss handler; and
an executable/non-executable (x) indicator associated with each page in memory wherein the TLB miss handler sets the x-indicator for a particular page to indicate "non-executable" when that page is accessed in a mode that allows writing to that page, and wherein the ITLB refuses to allow instructions from a page with an associated x-indicator of "non-executable" to be loaded, wherein the DTLB is utilized only for vector accesses to memory.

7. A system comprising:
a memory;
a plurality of pages held in the memory;
an instruction translation look aside buffer (ITLB);
a first data translation look aside buffer (DTLB);
a translation look aside (TLB) miss handler; and
an executable/non-executable (x) indicator associated with each page in memory wherein the TLB miss handler sets the x-indicator for a particular page to indicate "non-executable" when that page is accessed in a mode that allows writing to that page, and wherein the ITLB refuses to allow instructions from a page with an associated x-indicator of "non-executable" to be loaded, wherein the DTLB is utilized only for scalar accesses to memory.

8. A system comprising:
a memory;
a plurality of pages held in the memory;
an instruction translation look aside buffer (ITLB);
a first data translation look aside buffer (DTLB);
a translation look aside (TLB) miss handler; and
an executable/non-executable (x) indicator associated with each page in memory wherein the TLB miss handler sets the x-indicator for a particular page to indicate "non-executable" when that page is accessed in a mode that allows writing to that page, and wherein the ITLB refuses to allow instructions from a page with an associated x-indicator of "non-executable" to be loaded, further comprising for each page in memory:
a read bit indicating that the page is valid and readable; and
a write bit indicating that the page is valid and writable.

9. A system comprising:
a memory;
a plurality of pages held in the memory;
an instruction translation look aside buffer (ITLB);
a first data translation look aside buffer (DTLB);
a translation look aside (TLB) miss handler;
an executable/non-executable (x) indicator associated with each page in memory wherein the TLB miss handler sets the x-indicator for a particular page to indicate "non-executable" when that page is accessed in a mode that allows writing to that page, and wherein the ITLB refuses to allow instructions from a page with an associated x-indicator of "non-executable" to be loaded; and
a page table used to translate a virtual address to a real address, wherein the x-indicator for each page is held in the page table entry associated with that page, wherein the page table used to translate a virtual address to a real address includes:
a write bit in each page table entry; and
a read bit in each page table entry.

10. A system comprising:
a memory;
a plurality of pages held in the memory;
an instruction translation look aside buffer (ITLB);
an ITLB miss handler associated with the ITLB;
a data translation look aside buffer (DTLB);
a DTLB miss handler associated with the DTLB; and
an executable/non-executable x-indicator associated with each page in memory wherein the DTLB miss handler sets the x-indicator for a particular page to indicate "non-executable" when that page is accessed in a mode that allows writing to that page, and wherein the ITLB refuses to load instructions from a page if the x-indicator indicates a "non-executable" state.

11. The system of claim 10, wherein the ITLB miss handler sets the x-indicator to an "executable" state when a page is valid and executable.

12. The system of claim 10, wherein the ITLB miss handler is implemented at least in part as software.

13. The system of claim 10, wherein the DTLB miss handler is implemented at least in part as software.

14. The system of claim 10, further comprising a page table used to translate a virtual address to a real address, wherein the x-indicator for each page is held in the page table entry associated with that page.

15. The system of claim 14, wherein the page table used to translate a virtual address to a real address includes a write bit in each page table entry.

16. The system of claim 10, further comprising a write bit associated with each page in memory that indicates the respective page is writable.

17. A system comprising:
a memory;
a plurality of pages held in the memory;
an instruction translation look aside buffer (ITLB);
an ITLB miss handler associated with the ITLB;
a data translation look aside buffer (DTLB);
a DTLB miss handler associated with the DTLB; and
an executable/non-executable x-indicator associated with each page in memory wherein the DTLB miss handler sets the x-indicator for a particular page to indicate "non-executable" when that page is accessed in a mode that allows writing to that page, and wherein the ITLB refuses to load instructions from a page if the x-indicator indicates a "non-executable" state, wherein the DTLB is utilized only for scalar accesses to memory.

18. A system comprising:
a memory;
a plurality of pages held in the memory;
an instruction translation look aside buffer (ITLB);
an ITLB miss handler associated with the ITLB;
a data translation look aside buffer (DTLB);
a DTLB miss handler associated with the DTLB; and
an executable/non-executable x-indicator associated with each page in memory wherein the DTLB miss handler sets the x-indicator for a particular page to indicate "non-executable" when that page is accessed in a mode that allows writing to that page, and wherein the ITLB refuses to load instructions from a page if the x-indicator indicates a "non-executable" state, wherein the DTLB is utilized only for vector accesses to memory.

19. A system comprising:
a memory;
a plurality of pages held in the memory;
an instruction translation look aside buffer (ITLB);
an ITLB miss handler associated with the ITLB;
a data translation look aside buffer (DTLB);
a DTLB miss handler associated with the DTLB; and
an executable/non-executable x-indicator associated with each page in memory wherein the DTLB miss handler sets the x-indicator for a particular page to indicate "non-executable" when that page is accessed in a mode that allows writing to that page, and wherein the ITLB refuses to load instructions from a page if the x-indicator indicates a "non-executable" state, further comprising for each page in memory:
 a read bit indicating that the page is valid and readable; and
 a write bit indicating that the page is valid and writable.

20. A system comprising:
a memory;
a plurality of pages held in the memory;
an instruction translation look aside buffer (ITLB);
an ITLB miss handler associated with the ITLB;
a data translation look aside buffer (DTLB);
a DTLB miss handler associated with the DTLB;
an executable/non-executable x-indicator associated with each page in memory wherein the DTLB miss handler sets the x-indicator for a particular page to indicate "non-executable" when that page is accessed in a mode that allows writing to that page, and wherein the ITLB refuses to load instructions from a page if the x-indicator indicates a "non-executable" state; and
 a page table used to translate a virtual address to a real address, wherein the x-indicator for each page is held in the page table entry associated with that page, wherein the page table used to translate a virtual address to a real address includes:
a write bit in each page table entry; and
a read bit in each page table entry.

21. A computerized method comprising:
providing a system with a processor having a memory;
holding a plurality of pages in the memory;
translating an address for an instruction fetch; and
translating an address for a data access, wherein the translating of the address for the instruction fetch includes determining whether the address has an executable indication associated with the address and only if executable then continuing with the instruction fetch, and is done differently than the translating of the address for the data access, and
wherein the translating of the address for the data access includes setting a non-executable indication to "on" for a page holding the data access address if a write indication is set for that page.

22. A computer program product for use with a computer system having a processor and memory, the computer program product associated with translating virtual addresses to real addresses, the computer program product comprising a computer-usable medium having a set of instructions executable by a suitably programmed information handling system embodied in the computer usable medium for causing the computer system to execute a method comprising:
holding a plurality of pages in the memory;
translating an address for an instruction fetch; and
translating an address for a data access, wherein the translating of the address for the instruction fetch includes determining whether the address has an executable indication associated with the address and only if executable then continuing with the instruction fetch, and is done differently than the translating of the address for the data access, wherein the translating of the address for the data access includes setting a non executable indication, and wherein the translating of the address for the data access also includes setting the non executable indication for a page holding the data access address on if a write indication is set for that page.

23. A computer program product for use with a computer system having a processor and memory, the computer program product associated with translating virtual addresses to real addresses, the computer program product comprising a computer-usable medium having a set of instructions executable by a suitably programmed information handling system embodied in the computer usable medium for causing the computer system to execute a method comprising:
holding a plurality of pages in the memory;
translating an address for an instruction fetch; and
translating an address for a data access, wherein the translating of the address for the instruction fetch includes determining whether the address has an executable indication associated with the address and only if executable then continuing with the instruction fetch, and is done differently than the translating of the address for the data access, wherein the translating of the address for the data access includes setting a non executable indication, and wherein the non executable indication is set for a page holding the data access address in response to finding a write indication to allow writing to the page.

24. An apparatus for translating virtual to real addresses in a computing system having a processor and a memory, the apparatus comprising:
means for holding a plurality of pages in the memory;
means for translating addresses for instructions;
means for translating addresses for data, wherein means for translating addresses for instructions operates separately from means for translating addresses for data,
wherein means for translating the address of a page for a data access further includes means for setting a non executable indication, and
wherein means for translating of the address for the data access also includes means for setting the non executable indication to "on" for a page holding the data for the data access address if a write indication is set for that page.

25. The apparatus of claim 24, wherein means for setting the non executable indication is done for a page holding the data for a data access.

26. The apparatus of claim 24, wherein means for translating the addresses of the instructions includes means for checking the non executable indication.

27. The apparatus of claim 24, wherein means for translating the addresses of the instructions includes:
means for checking the non executable indication; and
means for disallowing an instruction-buffer load based on the non executable setting.

28. A system comprising:
a memory;
a plurality of pages held in the memory;
an instruction buffer;
a translation look aside buffer (TLB) having a plurality of TLB entries, each of the plurality of TLB entries having an instruction/data (I/D) indicator and data from a page in memory;
a translation look aside (TLB) miss handler; and
an executable/non-executable (x) indicator associated with each page in memory, wherein the TLB miss handler sets the I/D-indicator to be loaded into a particular TLB entry to indicate "instructions" when the associated page has its associated x-bit indicating "executable" and to indicate "data" when the associated page has its associated x-bit indicating "non-executable," and wherein the system refuses to allow data from a page indicated as "data" to be loaded into the instruction buffer.

29. The apparatus of claim 28, further comprising:
a cache having a plurality of cache lines, each cache line having an instruction/data (I/D) indicator, wherein, based on a TLB miss, the TLB miss handler loads at least one cache line with data from a page in memory and with an I/D indication based on the x-indicator associated with that page in memory.

30. The system of claim 28, wherein the DTLB includes a first portion used only for vector accesses to memory.

31. The system of claim 28, wherein the DTLB includes a second portion used only for scalar accesses to memory.

32. A system comprising:
a memory;
a plurality of pages held in the memory;
an instruction translation look aside buffer (ITLB);
a first data translation look aside buffer (first DTLB);
a translation look aside (TLB) miss handler; and
an executable/non-executable (x) indicator associated with each page in memory wherein the x-indicator for a particular page is set to indicate "non-executable" when that page is accessed in a mode that allows writing to that page, and wherein the TLB handler refuses to load the ITLB from a page with an associated x-indicator of "non-executable".

33. A system comprising:
a memory;
a plurality of pages held in the memory;
an instruction translation look aside buffer (ITLB);
a first data translation look aside buffer (first DTLB);
a translation look aside (TLB) miss handler; and
an executable/non-executable (x) indicator associated with each page in memory wherein the x-indicator for a particular page is set to indicate "non-executable" when that page is accessed in a mode that allows writing to that page, and wherein the TLB handler refuses to load the ITLB from a page with an associated x-indicator of "non-executable"; and
a cache having a plurality of cache lines, each cache line having an instruction/data (I/D) indicator, wherein, based on a TLB miss, the TLB miss handler loads at least one cache line with data from a page in memory and with an I/D indication based on the x-indicator associated with that page in memory.

34. The system of claim 33, further comprising a second DTLB, wherein the second DTLB is used only for scalar accesses to memory.

35. A system comprising:
a memory;
a plurality of pages held in the memory;
an instruction translation look aside buffer (ITLB);
a first data translation look aside buffer (first DTLB);
a translation look aside (TLB) miss handler; and
an executable/non-executable (x) indicator associated with each page in memory wherein the x-indicator for a particular page is set to indicate "non-executable" when that page is accessed in a mode that allows writing to that page, and wherein the TLB handler refuses to load the ITLB from a page with an associated x-indicator of "non-executable"; and
wherein the first DTLB is used only for vector accesses to memory.

\* \* \* \* \*